Sept. 19, 1944.    H. T. KRAFT    2,358,518
PIVOTAL CONNECTION
Filed Oct. 31, 1942
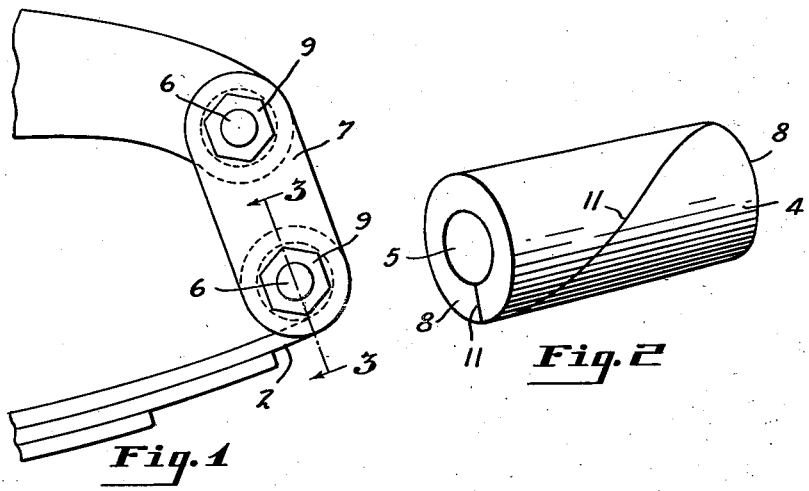
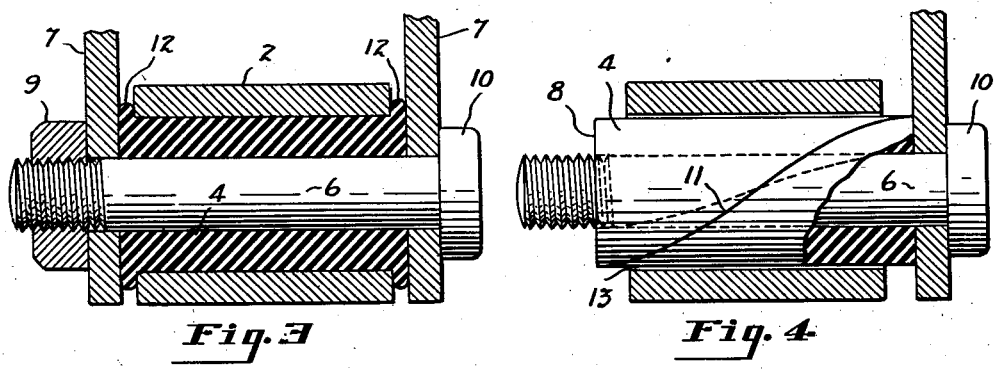
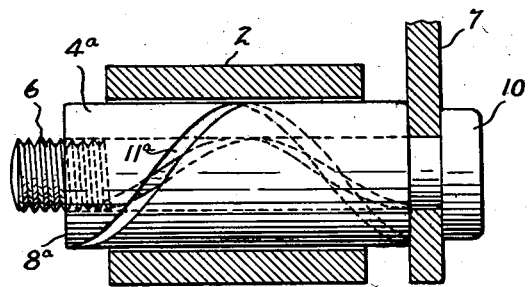
INVENTOR
*Herman T. Kraft*
BY
*Evans + McCoy*
ATTORNEYS Patented Sept. 19, 1944

2,358,518

UNITED STATES PATENT OFFICE 2,358,518

PIVOTAL CONNECTION

Herman T. Kraft, Akron, Ohio, assignor to The General Tire & Rubber Company, Akron, Ohio, a corporation of Ohio Application October 31, 1942, Serial No. 464,056

4 Claims. (Cl. 287—85)

This invention relates to rubber articulated torsional joints of the type having a rubber member longitudinally compressed to cause radial expansion of the rubber against both the pintle and the eye of the joint, so that relative torsional movement between the pintle and the eye will be taken up by strain in the rubber rather than by slippage between the rubber and the parts of the joint.

It is well-known that when the ends of a thick tubular mass of solid rubber or rubberlike material are compressed, the diameter of the tube will expand radially. This expansion in diameter, however, will be found to be much greater in the central portion of the tube than at the ends of the tube. When such a rubberlike tube is inserted within a solid metal sleeve and pressure is applied to the ends thereof to expand the rubber against the sleeve, as is customary in the preparation of certain torsional joints and the like, the radial pressure against the inner surface of the metal sleeve is not uniform. This is especially true if the inner diameter of the metal sleeve is considerably larger than the outer diameter of the tubular rubber bushing, as is desirable for purposes of assembly. Where the radial pressure in the central portion of the tube against the metal sleeve is greater than that at the ends, the rubber is not stressed uniformly and the loading is not uniformly distributed.

It is an object of the present invention to provide rubber articulated joints which may be easily assembled and which have the rubber uniformly expanded and uniformly pressed against the joint members throughout the entire length of the joint.

It is another object to provide rubber articulated joints of the type having a rubber tube which separates the metallic joint members under lateral compression to cause radial expansion of the rubber against the joint member and in which the rubber is under uniform stress throughout the entire length of the joint.

It is a further object to provide rubber articulated torsional joints in which the ends of the rubber which separate the joint members are compressed longitudinally to cause radial expansion and in which means is had for determining the degree of compression in the rubber.

A still further object is to provide rubber articulated joints in which the ends of a generally tubular, spirally slit rubber member are pressed longitudinally but in which compression of the rubber throughout the joint is in a spiral or circumferential direction rather than in an axial direction as when the force is transmitted through a solid tube or when the edges of the spiral slit are in contact.

Other objects and advantages will be apparent from the following detailed description of the invention, as illustrated by the accompanying drawing, in which:

Figure 1 is a side elevational view of portions of a vehicle spring and frame having shackle members embodying joints of the present invention;

Fig. 2 is a perspective view of the tubular rubber member which may be used in the joints of the present invention;

Fig. 3 is a sectional view of a portion of the joint of Fig. 1, taken on the line 3—3 of Fig. 1;

Fig. 4 is an elevational view, partly in section, of some of the elements of the joints embodying the present invention, showing the rubber member on the pintle in the unstressed condition as incorporated in the eye of the joint; and Fig. 5 is a similar view, partly in section, of portions of a modified joint having a spiral slit whose edges are not in contact so that compressive stress in the rubber is transmitted in a spiral or circumferential direction.

In accordance with the present invention, the members or parts of the joint which are subjected to relative torsional movement, i. e., pintle and eye member, are separated from each other by a spirally slit rubber sleeve or bushing, which is expanded strongly against both the pintle and the eye member of the joint by longitudinal pressure against the opposite ends of the bushing. The spiral slit through the bushing permits the use of a bushing of considerably smaller diameter than the inner diameter of the eye member, without impairing the uniformity of pressure along the portions of the joint. Thus, when the pressure is first applied to the ends of the joint, it has been found that a spiral slit in the bushing permits adjustment between portions thereof so that expansion in diameter takes place uniformly rather than only in the central portion.

In accordance with one form of joints of the present invention, the internal diameter of the rubberlike bushing member is considerably smaller than the external diameter of the pintle member or central sleeve portion of the joint so that a spiral space of considerable magnitude is formed. When pressure is applied to the ends of the bushing, the diameter of the bushing increases rapidly without causing contact between the spiral edges, and the forces which cause radial expansion of the rubber are transmitted along in the direction of the spiral rather than across the surface of the spiral in connection with the pintle member. Thus, most effective use of the compression of the rubber is obtained and provision is had for the desired longitudinal deformation of the material.

I am aware of the fact that it has heretofore been proposed to utilize spirally slit rubber bushings, the ends of which are subjected to lateral pressure in order to serve as a fastening means for holding castors and the like in place. However, I am not aware that it has heretofore been proposed to utilize spirally slit tubular bushings in a joint which is subjected to torsion between joint members, which torsion is taken up by strain in the rubber. I am also unaware that it has been proposed to utilize spiral bushings in which the spiral is of such a shape that slippage occurs along the contacting edges to permit equalization of stress.

Referring more particularly to the drawing, in which like parts are designated by like numerals of reference throughout the several views, torsional joints of the present invention comprise an eye member 2 which may, if desired, be a portion of a vehicle spring or frame having a cylindrical opening or eye 13 therethrough of sufficient size to receive the generally tubular bushing 4 of a rubber or rubber-like compound. The bushing 4 has a central tubular opening 5 which is adapted to receive the central member or pintle 6, which preferably has an outer cylindrical surface substantially coaxial with the inner cylinder surface of the eye 13.

A pressure element such as one of the spaced side connector plates 7 bears against each end 8 of the rubberlike bushing 4. The side connector plates may be non-rotatively mounted on the pintle with the aid of customary splined connections (not shown) if desired so that the torsional deflection of the eye member 2 with respect to the pintle connectors 7 is only had by torsional deflection of the pintle and the rubber 4. Means such as a nut 9 threaded on the pintle 6 in cooperation with a large head 10 is provided for laterally compressing the ends of the bushing or for moving the pressure elements toward each other to subject the ends 8 of the bushing to lateral compression, so as to cause relative sliding movement of portions of the rubber members along the slantwise or spiral cut 11, which extends through the bushing between the ends thereof. This sliding action results in radial thickening or expansion of the rubber against the internal surface of the eye member as well as against the surface of the pintle. The high radial pressure thus obtainable prevents slippage of the pintle 6 and the eye member 2 with respect to the rubber bushing 4, so that torsional movement between the joint members is had by effecting torsional strain in the rubber bushing 4 rather than by slippage between the vulcanized rubberlike material and the pintle or eye member of the joint.

The rubber bushing 4, which may be prepared in tubular form by extrusion if desired, has in its unstressed state a substantially greater length than that of the cylindrical opening or eye 3. Thus, when the bushing is compressed sufficiently to tightly bond the pintle with respect to the eye, the pressure elements 7, which may also serve as connectors to the pintle 6, are separated from the eye portion of the joint by a substantial amount of rubber 12.

I have found that the slope with the spiral cut 11 is very important if the proper adjustment of the rubber is obtained when the bushing is fitted into the joint. When the pintle 6 is of sufficient diameter that the spiral surfaces are in contact, the slope of the spiral should preferably be about sixty degrees with the ends 8 or about thirty degrees to the axis of the bushing 4. When the slope of the spiral is much less than forty or forty-five degrees with the ends of the bushing which lie in planes perpendicular to the axis, friction of most rubber stocks prevents the desired adjustment of the portions of the rubber; when the slope of the spiral is greater than seventy-five or eighty degrees, the tendency for uniform expansion is decreased. The preferred slope of the spiral cut 11 varies when the coefficient of friction of the surface changes and is greater when the coefficient of friction is increased. In most joints in which the edges of the slit are in contact, the slope should be such that the complete slit occurs within one-half of the joint.

When as in Fig. 5 the surfaces of the spiral cut are separated to leave a space while the inner and outer cylindrical surfaces of the rubber are respectively compressed against the pintle and the eye, the slope of the spiral is preferably such that at least a complete turn is had over the length of the joint. In the modification shown in Fig. 5, the proportions of the pintle and the eye are so chosen with respect to the bushing 4a that the bushing is in a spread condition, and the spiral surfaces of the spiral slot 11a do not bear against each other when the bushing is in place within the eye, with its inner cylindrical surface in contact with the pintle and with its outer cylindrical surface in contact with the eye. When pressure is applied to the ends 8a of the bushing so arranged, it is seen that compression takes place in a spiral or circumferential direction rather than axially as no force is transmitted across the gap of the spiral.

The torsional joints of the present invention have the rubber under uniform strain; the joints, therefore, have excellent life in commercial use.

It is to be understood that variations and modifications of the specific joints herein shown and described for purposes of illustration may be made without departing from the spirit of the invention.

What I claim is:

1. In a pivotal connection between members adapted to have relative torsional movement, the combination of an eye member having a substantially cylindrical opening therethrough, a pintle extending through and substantially coaxial with said cylindrical opening, a tubular bushing of soft rubberlike material having a spiral slit between the ends thereof separating said pintle from the cylindrical wall of said cylindrical opening and extending beyond the opposite ends of said cylindrical opening, and means for compressing the opposite ends of said rubberlike bushing to cause radial expansion of said bushing against the internal cylindrical wall of said opening and against the outer surface of said pintle, said spiral slit extending entirely through the wall of said bushing, the slope of said slit being about 40 degrees to about 80 degrees with respect to the planes perpendicular to the axis of said pintle to permit relative slipping movement of portions of said bushing, whereby initial expansion throughout the length of said cylindrical opening is substantially uniform.

2. In a pivotal connection between two members adapted to have relative torsional movement, the combination of an eye member connected to one of said members and having a substantially cylindrical opening therethrough, a pintle with a substantially cylindrical outer surface extending substantially coaxially through said cylindrical opening and connected at each end to the other of said members, a generally tubular bushing of rubber-like material over said cylindrical surface of said pintle and extending through and beyond said cylindrical opening and separating said pintle from the cylindrical surface of said opening, and means for compressing the opposite ends of said tubular bushing to cause expansion of the rubber tightly against the inner cylindrical surface of said opening and against the outer cylindrical surface of said pintle to prevent slippage between said pintle and said bushing, and between said cylindrical surface and said bushing when said pintle is torsionally deflected with respect to said eye member, said rubber bushing having a slantwise cut through the wall thereof and extending between the opposite ends thereof, the slope of said cut being sufficient to permit portions of said rubber to move laterally relative to each other when pressure is applied to the ends, whereby the bushing is expanded against the eye member with substantially uniform pressure.

3. In a pivotal connection between members adapted to have relative torsional movement, the combination of an eye member having a substantially cylindrical opening therethrough, a pintle extending through and substantially coaxial with said cylindrical opening, a tubular bushing of soft rubberlike material having a spiral split between the ends thereof separating said pintle from the cylindrical wall of said cylindrical opening and extending beyond the opposite ends of said cylindrical opening, and means for compressing the opposite ends of said rubberlike bushing to cause radial expansion of said bushing against the internal cylindrical wall of said opening and against the outer surface of said pintle, said spiral slit extending entirely through the wall of said bushing having contacting surfaces, and having a slope of between 20 degrees and 50 degrees with the longitudinal axis of the bushing to permit relative slipping movement of portions of said bushing, whereby initial expansion throughout the length of said cylindrical opening is substantially uniform.

4. In a pivotal connection between members adapted to have relative torsional movement, the combination of an eye member having a substantially cylindrical opening therethrough, a pintle extending through and substantially coaxial with said cylindrical opening, a tubular bushing of soft rubberlike material having a spiral slit between the ends thereof separating said pintle from the cylindrical wall of said cylindrical opening and extending beyond the opposite ends of said cylindrical opening, and means for compressing the opposite ends of said rubberlike bushing to cause radial expansion of said bushing against the internal cylindrical wall of said opening and against the outer surface of said pintle, said slit extending entirely through the wall of said bushing, the surfaces of said spiral slit being spaced apart, whereby compressive pressure on the ends of the bushing are transmitted in a circumferential and spiral direction through the rubberlike material.

HERMAN T. KRAFT.